(No Model.)
E. S. HALL.
PLUNGER BRAKE HEAD.
No. 601,651. Patented Apr. 5, 1898.
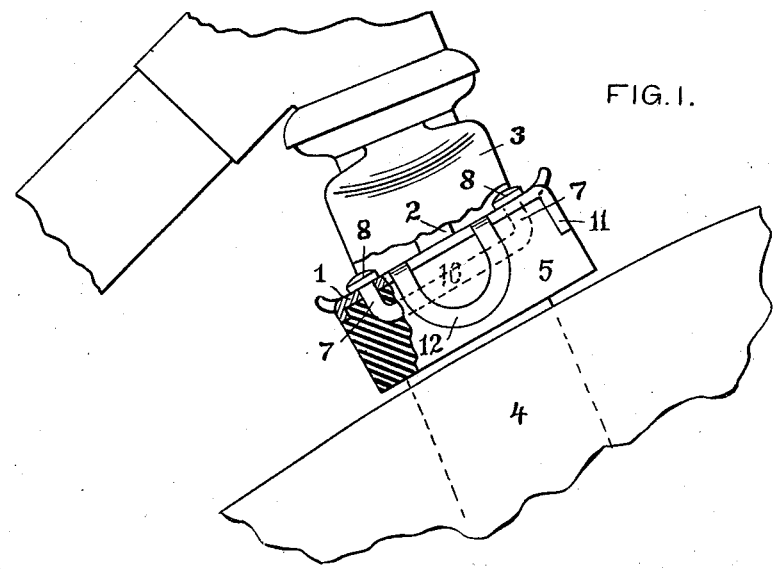
FIG. 1.
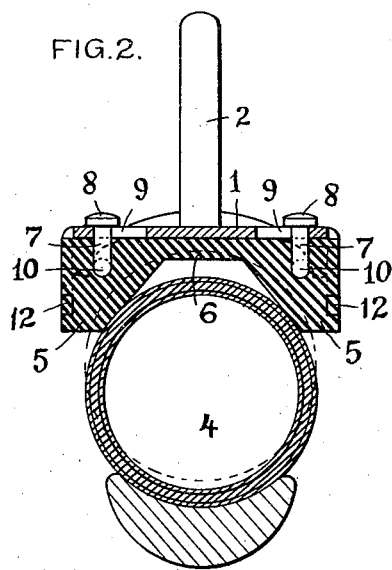
FIG. 2.
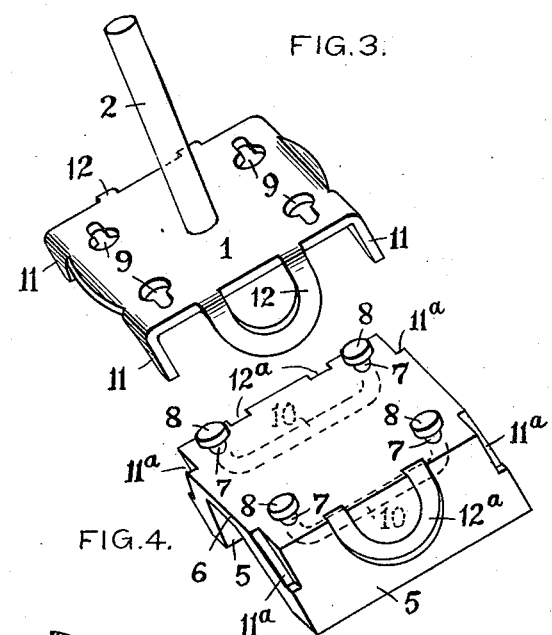
FIG. 3.
FIG. 4.
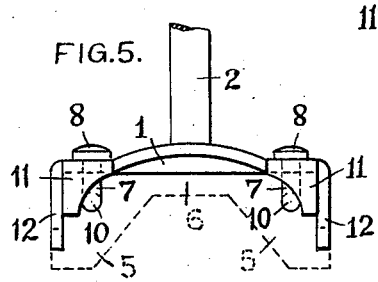
FIG. 5.
WITNESSES:
Donn Twitchell
E. L. Todd
INVENTOR
Edward Spencer Hall
BY
Alvin K. Goodwin
ATTORNEY.
THE NORRIS PETERS CO., PHOTO-LITHO., WASHINGTON, D. C.

UNITED STATES PATENT OFFICE.

EDWARD SPENCER HALL, OF NEW YORK, N. Y.

PLUNGER BRAKE-HEAD.

SPECIFICATION forming part of Letters Patent No. 601,651, dated April 5, 1898.

Application filed December 22, 1896. Serial No. 616,576. (No model.)

*To all whom it may concern:*

Be it known that I, EDWARD SPENCER HALL, a citizen of the United States, residing in the city of New York, county and State of New York, have invented certain new and useful Improvements in Plunger Brake-Heads, of which the following is a specification.

The object of this invention is to provide an improved plunger brake-head having a friction shoe or shoes which may be readily renewed at any time or place by a bicycle-rider and without the use of tools and which when applied to the pneumatic tire of a bicycle will not permit puncture of the tire even should the shoe be almost entirely worn away or should a much overworn shoe by any possibility be torn from its fastenings.

The invention will first be described, and then will be defined in claims hereinafter set forth.

Reference is made to the accompanying drawings, forming part of this specification, and in which—

Figure 1 is a sectional side view of parts of a bicycle fitted with my improved brake-head. Fig. 2 is a transverse sectional view of the brake-head and wheel-tire. Fig. 3 is a top perspective view of the head-plate of the brake device. Fig. 4 is a top perspective view of one preferred form of brake-shoe detached from the head-plate; and Fig. 5 is a front view of the head-plate, with the brake-shoe indicated by dotted lines.

The peculiarly-formed head-plate 1 is preferably made of stamped sheet metal and has a stem 2 suitably guided in the steering-fork 3 of a bicycle to present the brake-head to the wheel-tire 4. The brake-shoe is preferably of that class which acts at each side of the center of the tire and not directly upon its peripheral tread.

As shown, the brake-shoe is made in one piece of any suitable rubber or other elastic compound or yielding substance, which has two heavy side parts or blocks 5 5 acting on the wheel-tire. These blocks are connected by a thinner upper part 6, which is sufficiently elastic to permit the shoe to yield when adjusting it to the head-plate, as presently described. The blocks 5 5 may be made separate and may be connected by any suitable elastic intermediate part which would be the equivalent of the integral part 6.

I now prefer to fasten the brake-shoe blocks or parts 5 to the head-plate 1 by means of keys 7, which have a button-head 8, adapted to enter the larger part of a keyhole-slot 9, formed in the head-plate 1, and to lock outside this plate, while the key-shank rests in the narrow part of the slot. In the preferred device I mold the shanks of the keys 7 into the body of each brake-block 5 while the latter is being formed.

In view of the yielding nature of rubber or rubber compounds I make the key-fastenings secure by forming one key 7 upon each end of a metal wire or rod 10, which preferably is nearly as long as the block 5 and offers a very large area of joint-surface and makes it almost impossible for the block to be torn from the keys by friction of the block on the wheel-tire when the brake is applied. The wire 10 may be made round and is given rounded bends where it joins with the two keys 7 in a broad flat U form to permit said wire and keys to present only rounded surfaces to the bicycle-tire 4 should the block 5 be much overworn or should it by any possibility be torn partly or wholly away from the key-fastenings. The wires 10 and keys 7 may thus come in direct contact with a pneumatic tire without danger of puncturing it, and in this respect said wires are a material improvement over front and rear lugs pendent from a head-plate and having pins passed through them and axially through rotatory brake shoes or blocks, as in this latter old construction the tire would be cut or punctured by the pendent lugs should the rotatory brake-block be overworn or be accidentally torn from its pin-journal.

As a further improvement in connection with any approved rounded tire-guarding fastenings for the brake-shoe I provide the head-plate at the ends with pendent portions 11, which may be only at the forward end of the plate. These parts 11 take the forward thrust of the acting brake-shoe, and thus relieve its tire-guarding fastenings from most of the strain resulting from application of the brake to the wheel. I show pendent parts or lugs 11 at the rear end also of the head-plate, thus confining the shoe-blocks 5 at both ends. These pendent thrust-receiving portions 11 of the head-plate are intentionally cut away or concaved at their inner edges, so as to have these edges always lie outside the plane of the key-connecting wires 10, as best shown in Fig. 5 of the drawings, to have these rounded wires alone strike the tire should the block or part 5 be much overworn or should it be torn away from its fastenings at the head-plate. The wires 10 thus also form a guard, preventing contact of the plate-lugs 11 with the tire should the blocks 5 break away from the head-plate, which, however, is not likely to occur except through carelessness of the the rider in not renewing the brake-shoe at the proper time.

It will be understood that in so far as the connection of two fastenings 7 by a rounded and bent wire or rod 10 is concerned and also in so far as concerns the relative positions of the parts 10 11 to have the parts 10 guard the tire against puncture by the parts 11, as above described, it is immaterial whether the brake-shoe fastenings 7 have heads 8, adapted to buttonhole-slots 9 in the head-plate, or whether the fastenings 7 be held to this plate in any other manner. For instance, the parts 7 may have upper threaded ends which pass through holes in the head-plate and receive clamping-nuts outside the plate, or the ends of the embedded fastening-wire may not project beyond the brake-shoe and may receive headed screws passed through the head-plate.

It will be understood that the connection of the two keys 7 7 by upturned ends of the wire 10 is but a preferred construction which gives the most substantial hold of the fastenings in the yielding shoe. Any form of the embedded portions of the shoe-fastenings which will cause them to present only rounded surfaces to the wheel-tire to protect the tire from injury by the fastenings and which will cause said embedded portions of the fastenings to project toward the wheel-tire beyond the lugs 11 to protect the tire from puncture by the lugs comes within the scope of this part of my invention.

As a further improvement I provide the head-plate 1 with pendent side parts 12, which, as here shown, have a U form and constitute bearings taking the lateral thrust of the brake-blocks, and said parts 12 also incidentally relieve the keys 7 10 of outward lateral strains when the brake is applied.

As shown more clearly in Fig. 4 of the drawings, the brake-blocks 5 are preferably molded with end and side recesses $11^a$ $12^a$, which receive the pendent head-plate parts 11 12 and give a neat flush finish of the rubber shoe and metal head-plate, while the insertion of the side lugs 12 in the recesses $12^a$ gives additional thrust-bearings acting with the front lugs 11 to prevent forward movement of the shoe and relieve its key-fastenings when the brake is applied.

The tire 4 is shown in full lines in Fig. 2 of the drawings nearly as it appears relatively to the applied brake-shoe when the latter is new, and the higher dotted circle indicates the relation when the shoe is worn away to an extent making its renewal advisable. Should the brake-shoe be neglected until very much overworn and should it then break away from its fastenings, it is obvious that while the rounded key connections 10 will not damage the sides of the tire the periphery of the tire could not be injured by the smooth bottom face of the head-plate 1, which then would be presented to it. Safety of the tire is thus assured under all conditions of use of the brake.

When the brake-shoe is made in one piece 5 5 6 or should two separate blocks 5 5 be connected by any suitable elastic part, the shoe may be readily adjusted to the head-plate by first slipping one pair of key-heads 8 through corresponding slots 9 at one side of the head-plate and slipping the block 5 at that side into place and then bending the flexible intermediate connection or part at 6 until the opposite pair of key-heads 8 enter and lock at the other pair of head-plate slots 9. The normal expansive resiliency of the intermediate connection at 6 holds the two blocks 5 5 snugly to the side lugs 12 and between the end lugs 11 of the head-plate, while also holding the keys 7 securely locked in the narrow portions of the slots 9.

A worn-out shoe may be quickly and easily renewed by simply bending the part 6 downward from the head-plate until the heads 8 of keys 7 escape from the slots 9 and a new shoe conveniently carried in the tool-bag may be applied at any time or place in manner above described and without the use of tools.

Should the brake-blocks 5 5 be made entirely separate from each other, any suitable spring or other fastenings may be used to hold the keys 7 at the smaller parts of the key-hole-slots 9, as will readily be understood.

I claim as my invention—

1. A brake-head comprising a head-plate and a renewable shoe having embedded fastenings adapted for attaching it to the head-plate, said embedded fastenings of the shoe being nearer the wheel-tire than is the head-plate and presenting only rounded surfaces to the tire thereby preventing injury thereto by the fastenings should the shoe be overworn or be torn away from the head-plate.

2. A brake-head comprising a head-plate and a renewable shoe having partially-embedded fastenings adapted at their projecting portions for attaching the shoe to the head-plate, the embedded portions of the fastenings being nearer the wheel-tire than is the head-plate and presenting only rounded surfaces to the tire thereby preventing injury to the tire by the fastenings should the shoe be overworn or be torn away from the head-plate.

3. A brake-head comprising a head-plate and a renewable shoe having embedded fastenings each provided with two end portions adapted for attaching the shoe to the head-plate, said embedded portions of the shoe being nearer the wheel-tire than is the head-plate and presenting only rounded surfaces to the tire thereby preventing injury thereto by the fastenings should the shoe be overworn or be torn away from the head-plate.

4. A brake-head comprising a head-plate and a renewable shoe having partially-embedded fastenings adapted at their projecting end portions for attaching the shoe to the head-plate, said projecting portions of the fastenings being connected in pairs by the embedded portions and said embedded portions being nearer the wheel-tire than is the head-plate and presenting only rounded surfaces to the tire thereby preventing injury thereto by the fastenings should the shoe be overworn or be torn away from the head-plate.

5. A brake-head comprising a head-plate having two pairs of keyhole-slots and renewable friction shoe or shoes provided with partially-embedded fastenings, each fastening having a head at each of its projecting ends, the embedded portions of the fastenings being nearer the wheel-tire than is the head-plate and presenting only rounded surfaces to the tire thereby preventing injury thereto should the friction-shoes be overworn or be torn away; the projecting headed portions of each fastening being adapted to engage one pair of keyhole-slots in the head-plate and lock outside the plate.

6. A brake-head comprising a head-plate having lugs or parts taking endwise thrust of a brake-shoe, and a renewable shoe having embedded fastenings adapted for attaching it to the head-plate, said embedded fastenings being nearer the wheel-tire than is the head-plate and presenting only rounded surfaces to the tire thereby preventing injury thereto by the fastenings should the shoe be overworn or be torn away; said embedded brake-shoe fastenings also being nearer the tire than are the end-thrust-receiving lugs of the head-plate thereby guarding the tire against puncture by the lugs.

7. A brake-head comprising a head-plate and a renewable brake-shoe having embedded fastenings adapted for attaching it to the head-plate, said embedded fastenings being nearer the wheel-tire than is the head-plate and presenting only rounded surfaces to the tire thereby preventing injury thereto by the fastenings should the shoe be overworn or be torn away; said head-plate having end-thrust-receiving lugs which are farther from the tire than are the brake-shoe fastenings and are prevented from injuring the tire by said fastenings; said head-plate also having side resistance-pieces taking lateral thrust of the brake-shoe.

EDWARD SPENCER HALL.

Witnesses:
HELEN F. HALL,
A. MITCHELL HALL.